(12) United States Patent
Zhu et al.

(10) Patent No.: US 11,848,893 B2
(45) Date of Patent: Dec. 19, 2023

(54) CELL GROUP CONFIGURATION AND BACKHAUL COORDINATION FOR REMOTE INTERFERENCE MANAGEMENT

(71) Applicant: QUALCOMM Incorporated, San Diego, CA (US)

(72) Inventors: Xipeng Zhu, San Diego, CA (US); Huilin Xu, San Diego, CA (US); Yiqing Cao, Beijing (CN); Yuwei Ren, Beijing (CN); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 17/287,033

(22) PCT Filed: Oct. 31, 2019

(86) PCT No.: PCT/CN2019/114609
§ 371 (c)(1),
(2) Date: Apr. 20, 2021

(87) PCT Pub. No.: WO2020/088570
PCT Pub. Date: May 7, 2020

(65) Prior Publication Data
US 2021/0385049 A1 Dec. 9, 2021

(51) Int. Cl.
*H04L 5/00* (2006.01)
*H04B 17/345* (2015.01)
(Continued)

(52) U.S. Cl.
CPC ......... *H04L 5/0073* (2013.01); *H04B 17/345* (2015.01); *H04B 17/382* (2015.01); *H04W 92/20* (2013.01); *H04W 84/047* (2013.01)

(58) Field of Classification Search
CPC ... H04L 5/0073; H04B 17/345; H04B 17/382; H04W 92/20; H04W 84/047;
(Continued)

(56) References Cited

U.S. PATENT DOCUMENTS 8,538,406 B2   9/2013 Lee et al.
2014/0218240 A1  8/2014 Kpodzo et al.
(Continued)

FOREIGN PATENT DOCUMENTS

CN       101128063 A    2/2008
KR    20080016159 A    2/2008
(Continued)

OTHER PUBLICATIONS

LG Electronics: "Discussion on Mechanism for NR RIM Support", 3GPP TSG RAN WG1 Meeting #95, R1-1812570, Discussion on Mechanism for NR RIM Support Clean, 3rd Generation Partnership Project, Mobile Competence Centre, 650, Route Des Lucioles, F-06921 Sophia-Antipolis Cedex, vol. RAN WG1, No. Spokane, USA, Nov. 12, 2018-Nov. 16, 2018, Nov. 3, 2018, XP051478800, 7 Pages.
(Continued)

*Primary Examiner* — Quoc Thai N Vu
(74) *Attorney, Agent, or Firm* — Patterson + Sheridan, L.L.P.

(57) ABSTRACT

Certain aspects of the present disclosure provide techniques for cell group configuration and backhaul coordination for remote interference management. Aspects of the present disclosure provide a method for communications by a base station (BS). The BS receives a first configuration configuring a cell in at least one group of cells and configuring the cell with a group identification (ID). The BS receives a second configuration configuring the cell for at least one of: remote interference management reference signal (RIM-RS)
(Continued)

transmission or RIM-RS detection. The BS performs a remote interference management procedure based on at least the first configuration and the second configuration.

26 Claims, 17 Drawing Sheets

(51) Int. Cl.
*H04B 17/382* (2015.01)
*H04W 92/20* (2009.01)
*H04W 84/04* (2009.01)

(58) Field of Classification Search
CPC ... H04W 24/02; H04W 36/20; H04W 72/082; G01S 5/0215
See application file for complete search history.

(56) References Cited

U.S. PATENT DOCUMENTS

2021/0352554 A1* 11/2021 Barac ............... H04J 11/0056
2021/0400676 A1* 12/2021 Faxér ............... H04W 72/0446

FOREIGN PATENT DOCUMENTS

KR   20120069235 A   6/2012
WO    2018112403 A1   6/2018

OTHER PUBLICATIONS

Qualcomm Incorporated: "Dynamic Cell Group Configuration for Remote Interference Management", 3GPP TSG-RAN WG3 #102, R3-186462 Cell Group Configuration for RIM, 3rd Generation Partnership Project, Mobile Competence Centre, 650, Route Des Lucioles, F-06921 Sophia-Antipolis Cedex, France, vol. RAN WG3, No. Spokane, USA, Nov. 12, 2018-Nov. 16, 2018, Nov. 11, 2018, XP051558250, 5 Pages.
Supplementary European Search Report—EP19880496—Search Authority—Munich—dated Jun. 14, 2022.
ZTE: "Consideration on RIM Framework and Mechanisms for Improving Network Robustness", R1-1808325, 3GPP TSG-RAN WG1 Meeting #94, 3rd Generation Partnership Project, Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 11, 2018, XP051515708, pp. 1-7.
CMCC : "Draft Summary on Study on NR-RIM," 3GPP TSG RAN WG1 Meeting #94bis, R1-1811884, Oct. 9, 2018 (Oct. 9, 2018), 36 pages, sections 2.1.1, 2.3.1.
International Search Report and Written Opinion—PCT/CN2018/113402—ISA/EPO—dated Jul. 29, 2019.
International Search Report and Written Opinion—PCT/CN2019/114609—ISA/EPO—dated Jan. 23, 2020.
Nokia, et al., "Considerations on Identifying Strong gNB Interferers", 3GPP TSG RAN WG1 Meeting #94bis, R1-1811212, Oct. 12, 2018 (Oct. 12, 2018), 5 Pages, sections 2-3.
Qualcomm Incorporated: "Coordinated RS Transmission," 3GPP TSG-RAN WG3 #101bis, R3-185515, Sep. 29, 2018 (Sep. 29, 2018), section 2, 3 pages.
ZTE: "Consideration on Mechanisms for Improving Network Robustness", 3GPP TSG RAN WG1 Meeting #94bis, R1-1810331, Chengdu, China, Oct. 8-12, 2018, pp. 1-10.
ZTE: "Consideration on Reference Signal Design for Remote Interference Management", 3GPP TSG RAN WG1 Meeting #94, R1-1808326, Gothenburg, Sweden, Aug. 20-24, 2018, 10 Pages, sections 2 and 3.

* cited by examiner

CELL GROUP CONFIGURATION AND BACKHAUL COORDINATION FOR REMOTE INTERFERENCE MANAGEMENT

CROSS REFERENCE TO RELATED APPLICATIONS

This application is a national stage application under 35 U.S.C. 371 of PCT/CN2019/114609, filed Oct. 31, 2019, which claims benefit of priority to International Patent Cooperation Treaty Application No. PCT/CN2018/113402, filed Nov. 1, 2018, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for cell group configuration and backhaul coordination for remote interference management.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for communication by a base station (BS). The method generally includes receiving a first configuration configuring a cell in at least one group of cells and configuring the cell with a group identification (ID). The method generally includes receiving a second configuration configuring the cell for at least one of: remote interference management reference signal (RIM-RS) transmission or RIM-RS detection. The method generally includes performing a RIM procedure based on at least the first configuration and the second configuration.

Certain aspects provide a method for communication by an operation and management (OAM) entity. The method generally includes configuring a cell of a BS in at least one group of cells for at least one of: remote interference detection, RIM-RS receiving, or RIM-RS transmission. The method generally includes configuring the cell with a ID for the at least one group of cells.

Certain aspects provide an apparatus for communication. The apparatus generally includes a memory and at least one processor coupled with the memory. The at least one processor is generally configured to receive a first configuration configuring a cell in at least one group of cells and configuring the cell with a group ID. The at least one processor is generally configured to receive a second configuration configuring the cell for at least one of: RIM-RS transmission or RIM-RS detection. The at least one processor is generally configured to perform a RIM procedure based on at least the first configuration and the second configuration.

Certain aspects provide an apparatus for communication. The apparatus generally includes a memory and at least one processor coupled with the memory. The at least one processor is generally configured to configure a cell of a BS in at least one group of cells for at least one of: remote interference detection, RIM-RS receiving, or RIM-RS transmission. The at least one processor is generally configured to configure the cell with a ID for the at least one group of cells.

Certain aspects provide an apparatus for communication. The apparatus generally includes means for receiving a first configuration configuring a cell in at least one group of cells and configuring the cell with a group ID. The apparatus generally includes means for receiving a second configuration configuring the cell for at least one of: RIM-RS transmission or RIM-RS detection. The apparatus generally includes means for performing a RIM procedure based on at least the first configuration and the second configuration.

Certain aspects provide an apparatus for communication. The apparatus generally includes means for configuring a cell of a BS in at least one group of cells for at least one of: remote interference detection, RIM-RS receiving, or RIM-RS transmission. The apparatus generally includes means for configuring the cell with a ID for the at least one group of cells.

Certain aspects provide a computer readable medium storing computer executable code thereon. The computer readable medium generally includes code for receiving a first configuration configuring a cell in at least one group of cells and configuring the cell with a group ID. The computer readable medium generally includes code for receiving a second configuration configuring the cell for at least one of: RIM-RS transmission or RIM-RS detection. The computer readable medium generally includes code for performing a RIM procedure based on at least the first configuration and the second configuration.

Certain aspects provide a computer readable medium storing computer executable code thereon. The computer readable medium generally includes code for configuring a cell of a BS in at least one group of cells for at least one of: remote interference detection, RIM-RS receiving, or RIM-RS transmission. The computer readable medium generally includes code for configuring the cell with a ID for the at least one group of cells.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
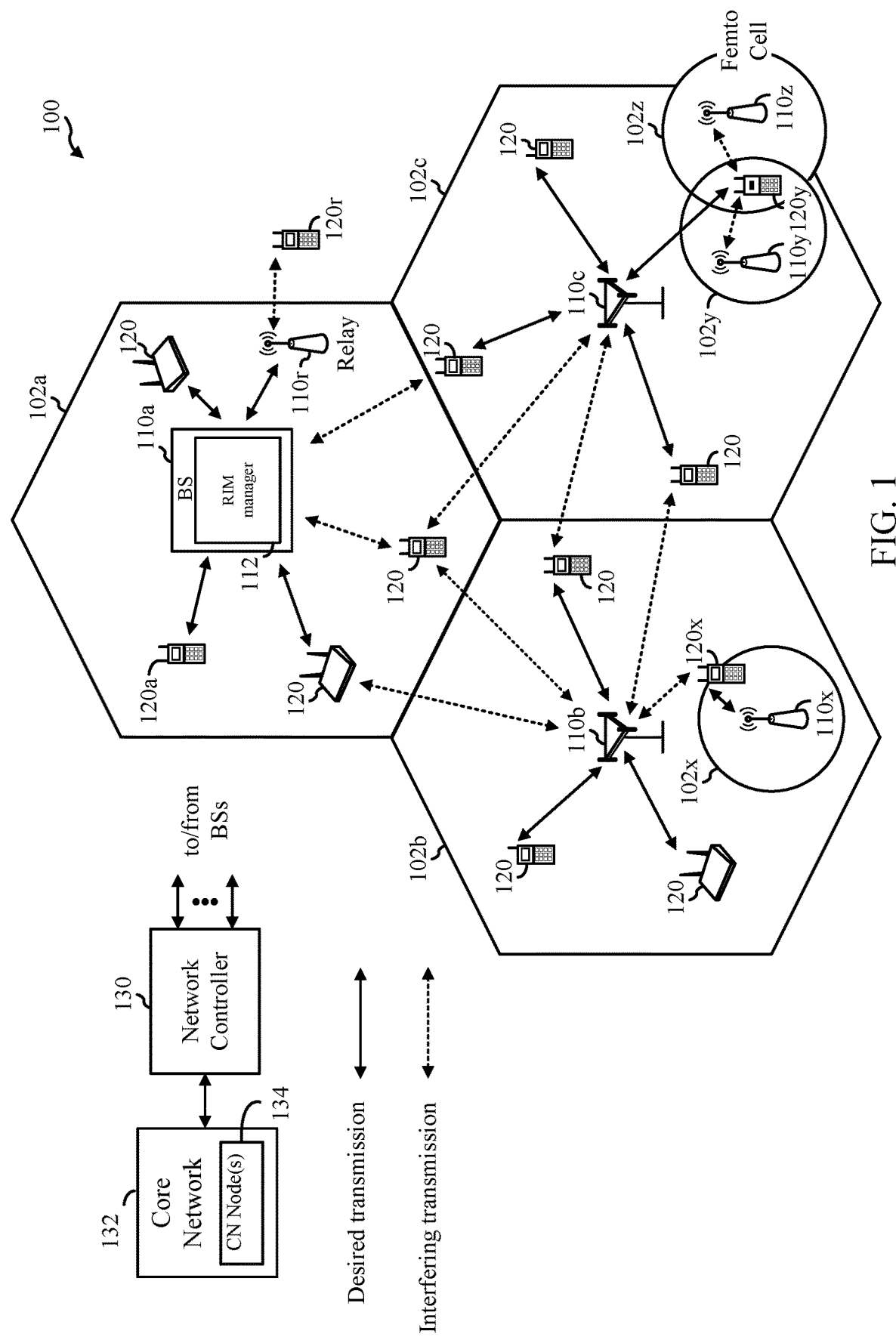
FIG. 1 is a block diagram conceptually illustrating an example telecommunications system, in accordance with certain aspects of the present disclosure.

Aspects of the present disclosure provide apparatus, methods, processing systems, and computer readable mediums for cell group configuration and backhaul coordination for remote interference management (RIM).

Non-adjacent base stations (BSs), covering cells that are not next adjacent to one another, may be located far apart geographically. Downlink transmission in a cell may cause remote interference to one or more non-adjacent cell(s) in one or more uplink slot(s). The remote interference can be due to atmospheric ducting. Various frameworks, discussed in more detail herein, are proposed for remote interference management and may involve use of RIM reference signals (RIM-RS).

In certain systems, such as new radio (NR) systems, BSs can be grouped, which may be referred to as a "cluster", "cell group" or "cell set". Identifiers (IDs) may be encoded into the RIM-RSs to support the BS grouping. The clusters may be configured by operation and management (OAM) signaling, for example, by an OAM entity.

Aspects of the present disclosure provide techniques and apparatus for cell group configuration and backhaul coordination for remote interference management.

The following description provides examples of cell group configuration and backhaul coordination for RIM, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless networks and radio technologies. For clarity, while aspects may be described herein using terminology commonly associated with 3G, 4G, and/or 5G wireless technologies, aspects of the present disclosure can be applied in other generation-based communication systems, including later technologies.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

5G NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs and provide coordination and control for these BSs. The network controller 130 may communicate with the BSs 110 via a backhaul.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., a relay station 110r), also referred to as relays or the link, that receive a transmission of data and/or other information from an upstream station (e.g., a BS 110a or a UE 120r) and send a transmission of the data and/or other information to a downstream station (e.g., a UE 120 or a BS 110), or that relays transmissions between UEs 120.

The wireless communication network 100 may be a 5G NR network. According to certain aspects, the BSs 110 may be configured for remote interference management. As shown in FIG. 1, the BS 110a includes a RIM manager 112. The RIM manager 112 may be configured to receive a first configuration configuring the BS 110 in at least one group of cells and configuring the BS 110 with a group member ID. The RIM manager 112 may be configured to receive a second configuration for RIM-RS transmission and/or RIM-RS detection. The RIM manager 112 may be configured to perform a RIM procedure based on at least the first configuration and the second configuration. The first and/or second configuration may be configured by an organization and management (OAM) server, a cell group coordinator (CGC), or a combination of the OAM server and CGC. The first and/or second configuration may be static, semi-static, and/or dynamic.

Figure 2:
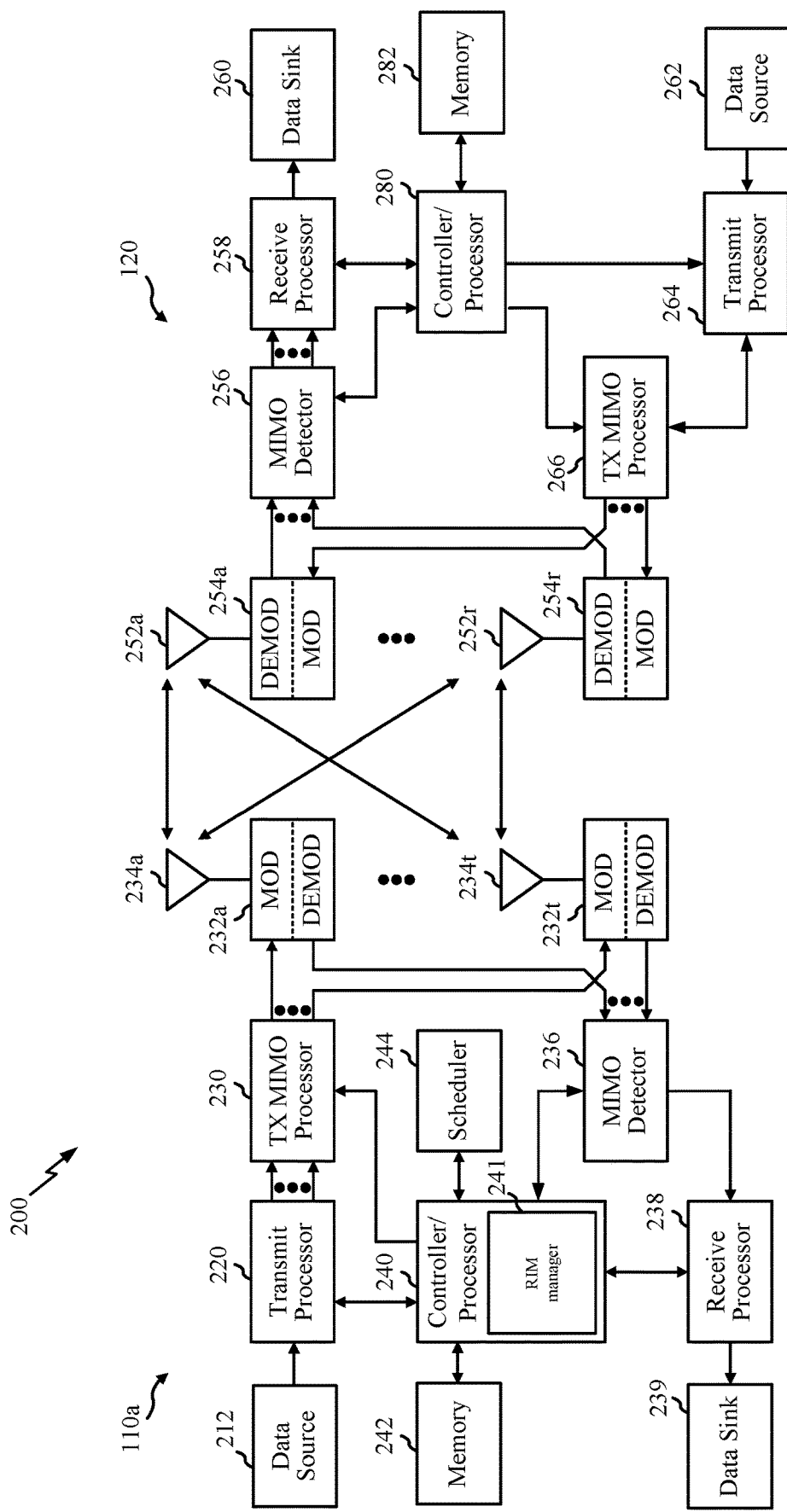
FIG. 2 is a block diagram conceptually illustrating a design of an example base station (BS) and user equipment (UE), in accordance with certain aspects of the present disclosure.

FIG. 2 illustrates example components of BS 110a and UE 120 (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), channel state information reference signal (CSI-RS), and/or RIM-RS. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a through 254r (e.g., for SC-FDM, etc.), and transmitted to the BS 110a. At the BS 110a, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

Antennas 234, processors 220, 230, 238, and/or controller/processor 240 of the BS 110a may be used to perform the various techniques and methods described herein. As shown in FIG. 2, the controller/processor 240 of the BS 110a includes the RIM manager 241. The RIM manager 241 may be configured for cell group configuration and backhaul coordination for remote interference management, in accordance with aspects of the disclosure. The memories 242 and 282 may store data and program codes for BS 110a and UE 120, respectively. A scheduler 244 may schedule UEs for data transmission on the downlink and/or uplink.

NR may utilize orthogonal frequency division multiplexing (OFDM) with cyclic prefix (CP) on the uplink and/or downlink and/or single-carrier frequency division multiplexing (SC-FDM) on the uplink. NR may use half-duplex operation with time division duplexing (TDD). OFDM and SC-FDM partition the system bandwidth into multiple orthogonal subcarriers, referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers) may be dependent on the system bandwidth. NR may support a base subcarrier spacing (SCS) of 15 KHz and other SCS may be defined with respect to the base SCS, for example, 30 kHz, 60 kHz, 120 kHz, 240 kHz, etc. In NR, the minimum resource allocation (a "resource block" (RB)) may be 12 consecutive subcarriers. The system bandwidth may also be partitioned into subbands. For example, a subband may cover multiple RBs.

Figure 3:
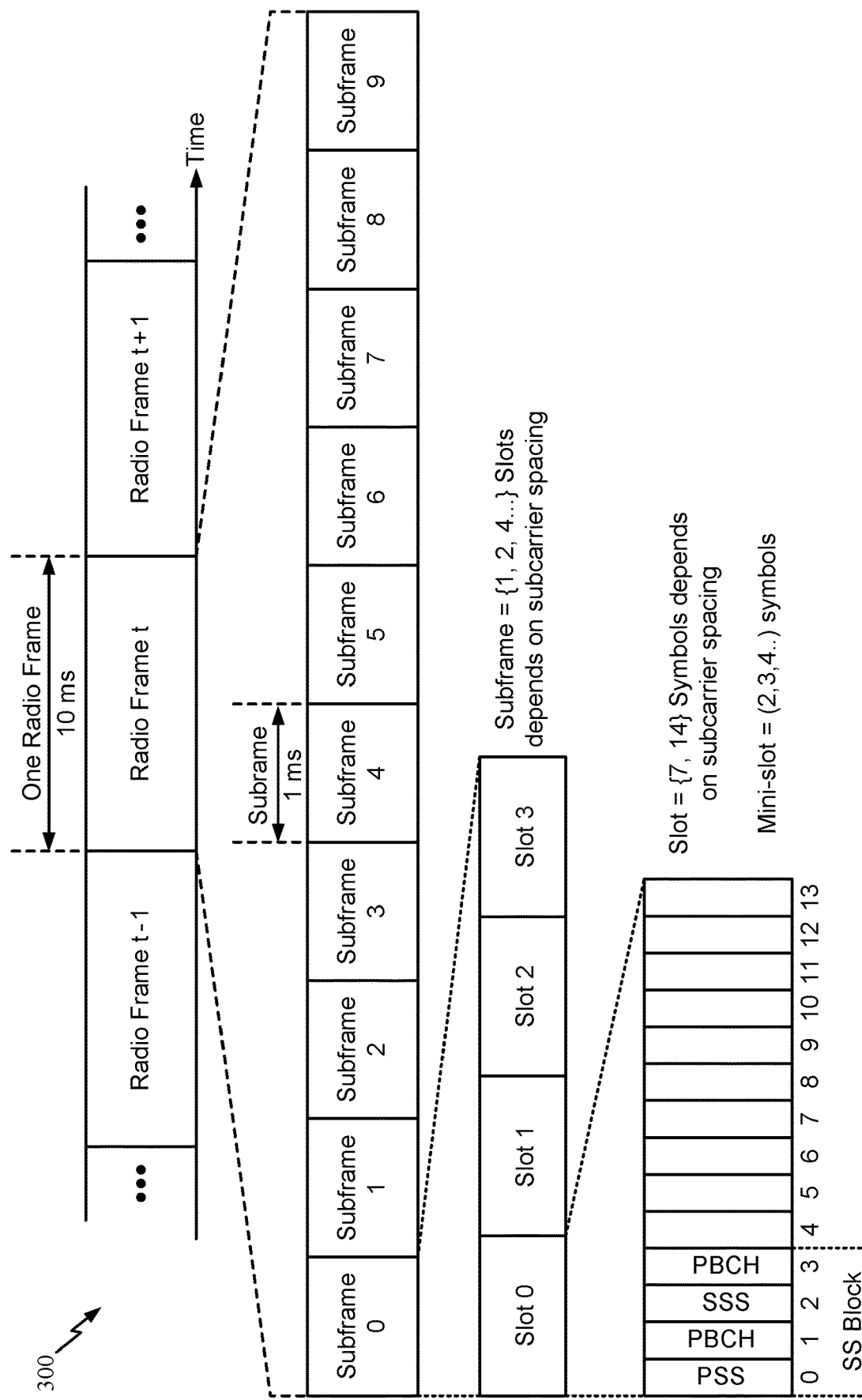
FIG. 3 illustrates an example of a frame format for a new radio (NR) system, in accordance with certain aspects of the present disclosure.

In NR, a subframe is 1 ms, but the basic TTI is referred to as a slot. A subframe contains a variable number of slots (e.g., 1, 2, 4, 8, 16, . . . slots) depending on the subcarrier spacing. The symbol, slot lengths, and CP scale with the SCS. FIG. 3 is a diagram showing an example of a frame format 600 for NR. As shown in FIG. 3, the transmission timeline for each of the downlink and uplink are partitioned into units of radio frames. Each radio frame has a predetermined duration (e.g., 10 ms) and is partitioned into 10 subframes, each of 1 ms, with indices of 0 through 9. Each subframe includes a variable number of slots depending on the SCS, and each slot includes a variable number of symbol periods (e.g., 7 or 14 symbols) depending on the SCS. The symbol periods in each slot are assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

As mentioned above, aspects herein relate to communication between non-adjacent BSs, also sometimes referred to as remote BSs, and remote interference management for such non-adjacent BSs. Non-adjacent BSs may be located far apart geographically, meaning they might not cover cells that are next to or adjacent to one another.

Remote interference is a type of cross-link interference that may occur in a telecommunication system. In particular, in remote interference, DL transmissions of a first or remote BS or group of BSs (sometimes referred to as the "aggressor") become interference to the UL reception of another BS or group of BSs (sometimes referred to as the "victim"). The DL transmissions of the aggressor may interfere with the ability of the victim to successfully receive and decode UL transmissions from UEs in the cell of the victim. Antennas of a BS can be oriented (e.g., tilted down) to try and ensure DL transmissions from the BS are only observable in the cell of the BS, however, that is not always the case. For example, the DL transmissions from the BS may be reflected (e.g., on a mountain, ocean, cloud, etc.) to a distance greater than the cell of the BS.

In certain cases, even if the BSs are synchronized, there may still be remote interference. For example, DL transmissions from an aggressor BS may be received with a delay (e.g., due to the path taken by the DL transmissions) at the victim BS such that the DL transmissions are received in a time period used for UL communication by the victim BS.

Figure 4:
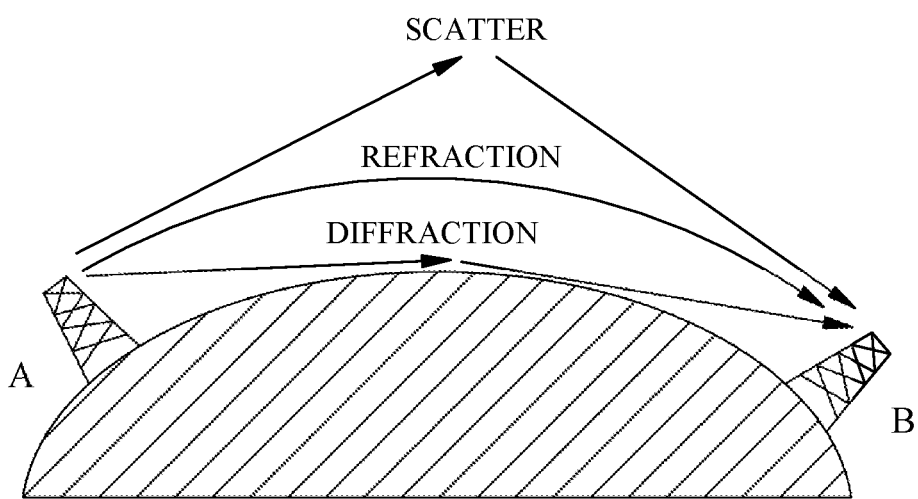
FIG. 4 illustrates an example of refraction of signals due to atmospheric ducting, in accordance with certain aspects of the present disclosure.

Remote interference may be caused by atmospheric ducting in some weather conditions. In telecommunications, an atmospheric duct is a horizontal layer in the lower atmosphere, in which vertical refractive index gradients are such that radio signals (and light rays) are guided or ducted along the length of the duct. The radio signals in the ducts, therefore, tend to follow the curvature of the Earth. They also experience less attenuation in the ducts than they would if the ducts were not present. Lower densities at higher altitudes in the Earth's atmosphere cause a reduced refractive index that bends signals back towards the earth, as shown in FIG. 4. Because densities change in the atmosphere, the refractive index also changes according to Snell's Law.

Figure 5:
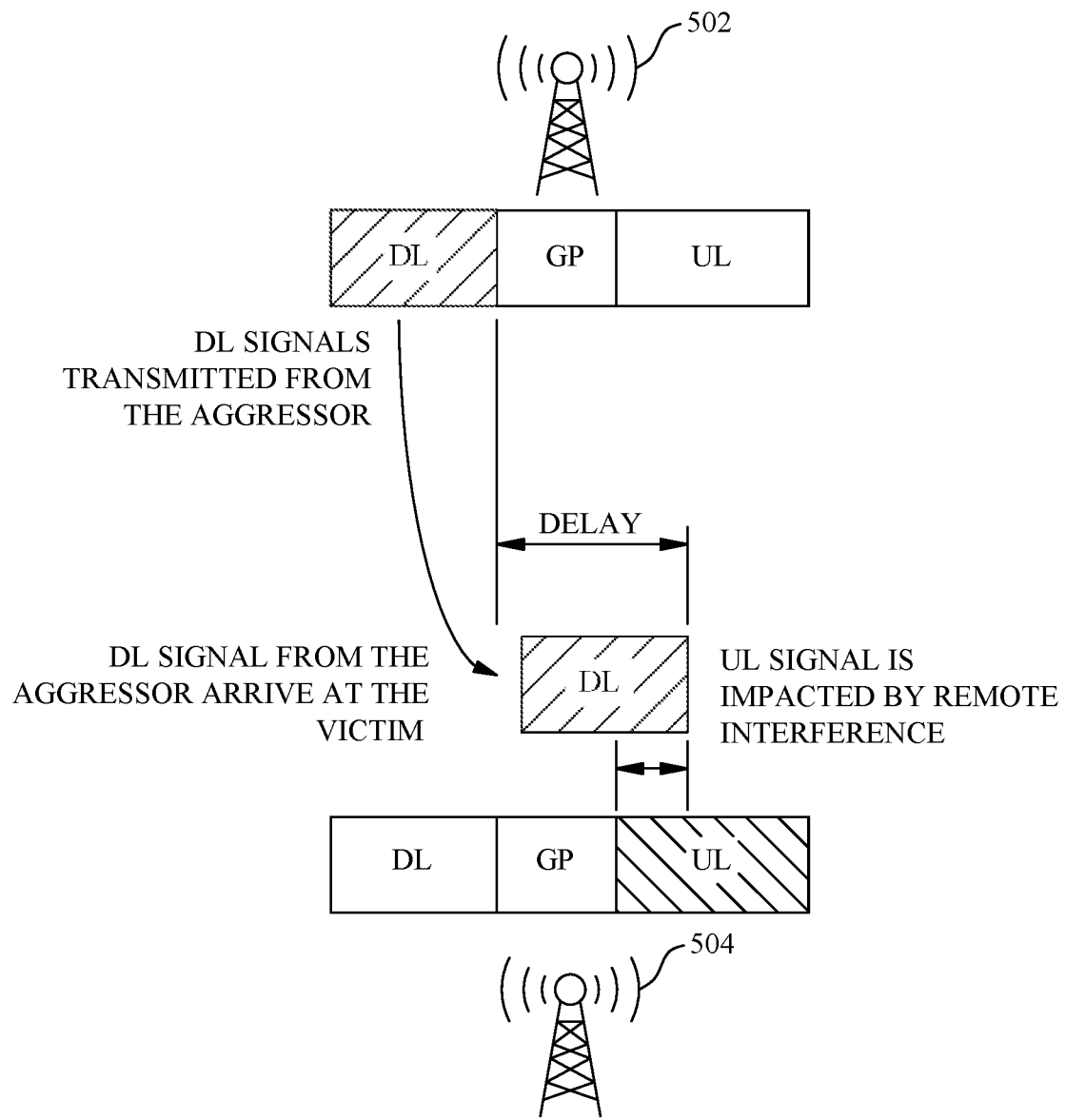
FIG. 5 illustrates an example of remote interference to a victim cell by an aggressor cell, in accordance with certain aspects of the present disclosure.

Atmospheric dusting may lead to downlink signals from an aggressor BS falling into uplink subframes of a non-adjacent victim BS. As shown in FIG. 5, downlink signals transmitted from the aggressor BS 502 during downlink subframes may arrive at the victim BS 504 during the guard period and/or uplink subframes (e.g., due to delay caused by atmospheric ducting). For example, an atmospheric ducting may cause long-distance DL signals of the aggressor BS 502 to travel through the atmosphere with a long transmission delay but with a very low attenuation, thereby, affecting the UL reception of the victim BS 504. As a result, the victim BS 504 may experience remote interference caused by the aggressor BS 502, even when it is located very far away (e.g., up to 400 kms).

Figure 6:
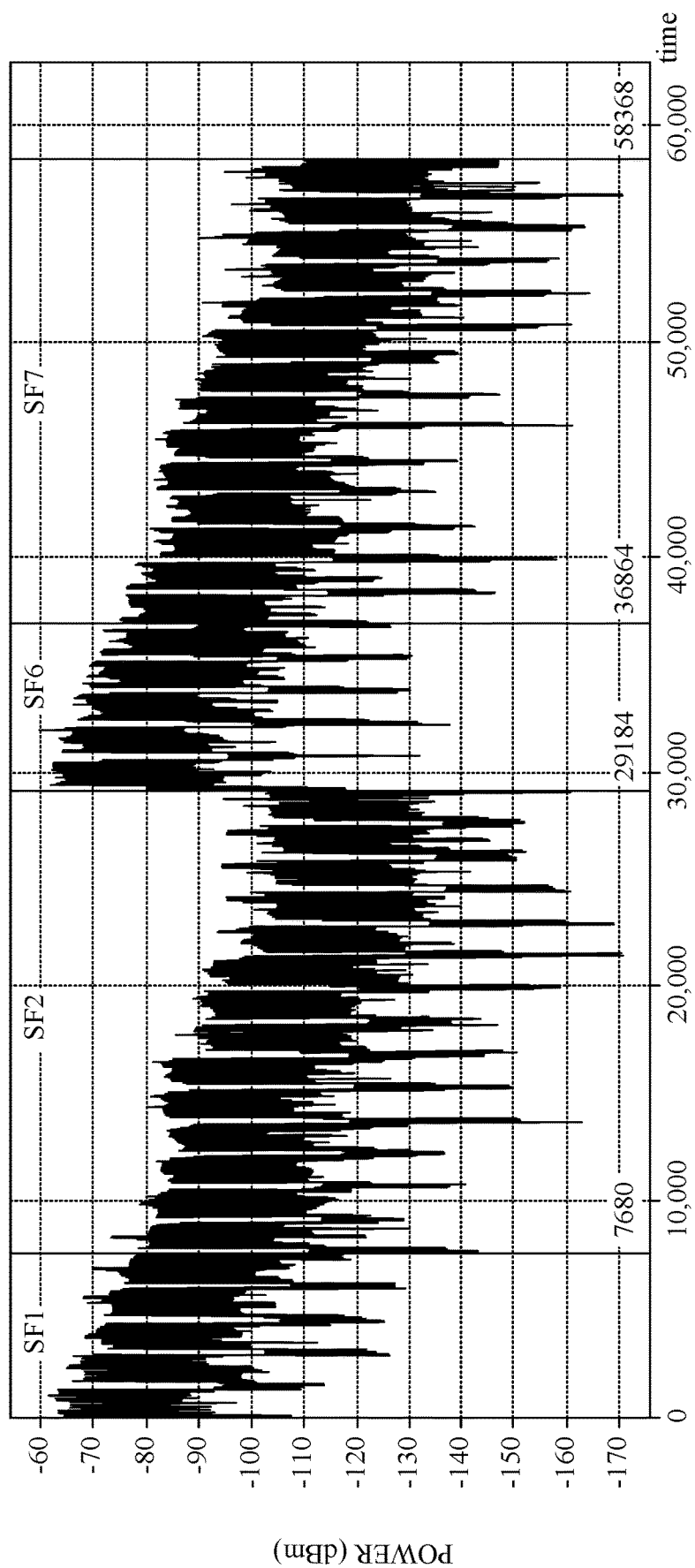
FIG. 6 is a graph illustrating a sloping interference over thermal, in accordance with certain aspects of the present disclosure.

The remote interference (e.g., from the aggressor BS 502 to the victim BS 504) leads to a rise in the interference-over-thermal (IOT). When remote interference is received, the IOT at the BS rises (e.g., has a slope), as shown in the example graph in FIG. 6. The example in FIG. 6 shows an example IOT for an LTE-TDD uplink-downlink subframe configuration of DSUDD, where subframes SF1, SF2, SF6, and SF7 can be used for uplink. The sloping is caused by the aggregated interference from aggressor cells at varying distances from the victim cell. For example, a first aggressor, which is the closest aggressor to the victim, may only cause interference to the first uplink symbol after the gap of the victim. While for another aggressor, which is further away from the victim, the downlink signals propagate over a longer distance and may impact more uplink symbols of the victim. Therefore, different uplink symbols may suffer from interference caused by different numbers of aggressors. For example, the symbols close to the gap may have accumulated interference caused by more aggressors than symbols further from the gap, resulting in the sloping IOT in time domain. Further, since the first aggressor is closer to the victim, the downlink signals of the closer aggressor may arrive at the victim with higher power compared to those of further aggressors. Therefore, the interference at uplink symbols closer to the gap may be higher than that at uplink symbols that are far away from the gap.

Remote interference management (RIM) can be used to manage the interference caused to the victim cells. In some examples, an aggressor is causing remote interference to a victim. When the victim detects remote interference (e.g., an increase in IOT), the victim sends a reference signal (RS) to the aggressor. The aggressor may detect the RS and report the detected RS to an operation and management (OAM) entity in the network. The OAM may then configure RIM procedures for the aggressor. The aggressor applies the configure RIM solutions. This RIM framework may not be self-adaptive. The stop of RS transmission, the triggering and stop of RS monitoring, the triggering and stop of applications of the remote interference mitigation solutions all rely on manual intervention through the OAM. This may introduce delay causing degradation of both network performance and efficiency.

Figure 7:
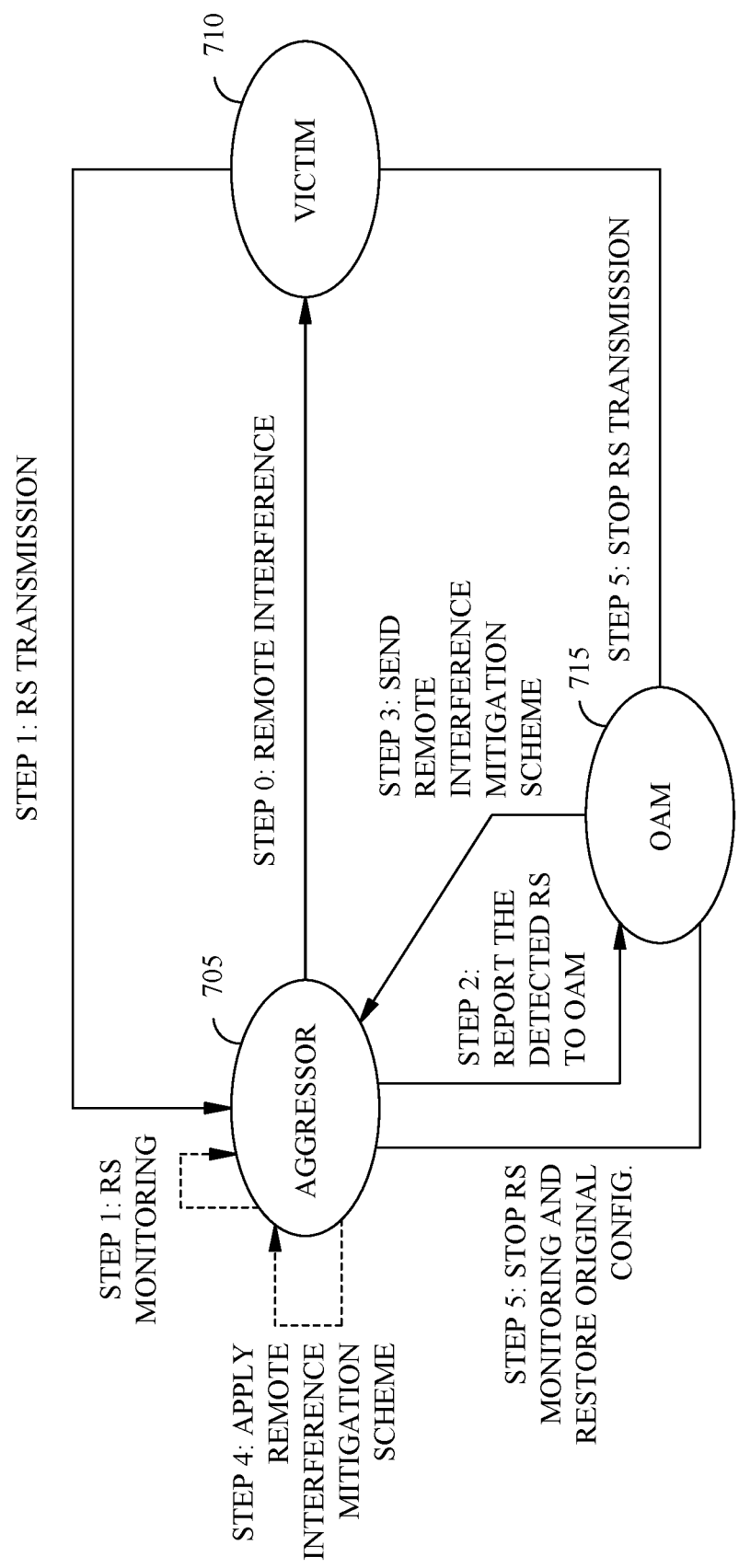
FIG. 7 illustrates an example remote interference management framework, in accordance with certain aspects of the present disclosure.

FIG. 7 shows an example RIM framework (e.g., referred to as framework 0). As shown in FIG. 7, at step 0, the aggressor 705 remote interferes the victim 710 (e.g., due to atmospheric dusting or other scenarios described above). At step 1, the victim 710 detects the remote interference (e.g., detects rise in IOT) and starts RS transmission to the aggressor 705, and the aggressor 705 starts monitoring RS as configured by OAM 715 (e.g., by an operations, administration, and maintenance (OAM) server). At step 2, the aggressor 705 receives the victim RS and reports the detected RS to OAM 715. At step 3, OAM 715 sends a remote interference mitigation scheme to the aggressor 705. At step 4, the aggressor 705 applies the remote interference mitigation scheme. And at step 5, OAM 715 stops RS monitoring, restores the original configuration at the aggressor side, and stops RS transmission at the victim side.

Figure 8:
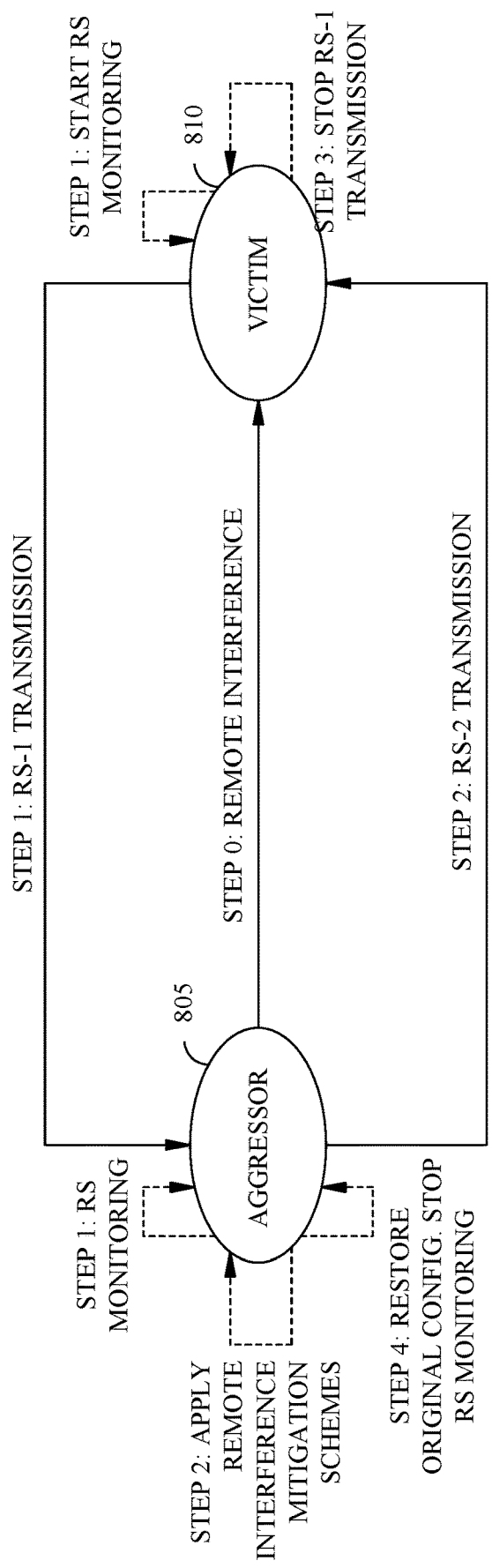
FIG. 8 illustrates another example remote interference management framework, in accordance with certain aspects of the present disclosure.

FIG. 8 shows another example RIM framework (e.g., referred to as framework 1). As shown in FIG. 8, at step 0, the aggressor(s) 805 remote interferes the victim 810 (e.g., due to atmospheric dusting). At step 1, the victim 810 detects the remote interference (e.g., detects rise in IOT) and starts RS transmission to the aggressor(s) 805, and the aggressor(s) 805 starts monitoring RS as configured by OAM. At step 1, the victim 810 also starts monitoring RS from the aggressor 805. This RS (shown as RS-1 in FIG. 8) is used to assist the aggressor(s) to recognize that they are causing remote interference to the victim 810 and to detect/deduce how many UL resources of the victim are impacted by the aggressor(s) 805. At step 2, the aggressor 805 receives the victim RS and starts remote interference mitigation (e.g., without first reporting the RS reception to the OAM and waiting for the OAM to configure the RIM scheme to apply), such as by muting some DL transmission symbols. Also at step 2, the aggressor 805 transmits RS (shown as RS-2 in FIG. 8), the victim can use the received RS to determine that there is still remote interference (e.g., the atmospheric ducting phenomenon still exists). At step 3, the victim 810 continues transmitting its RS until it stops receiving the RS from the aggressor 805 (e.g., after a threshold duration or timer). At step 4, the aggressor 805 continues performing the remote interference mitigation scheme until it stops receiving the RS from the victim 810. Once the aggressor 805 stops receiving the RS from the victim 810, the aggressor 810 restores the original configuration.

Figure 9:
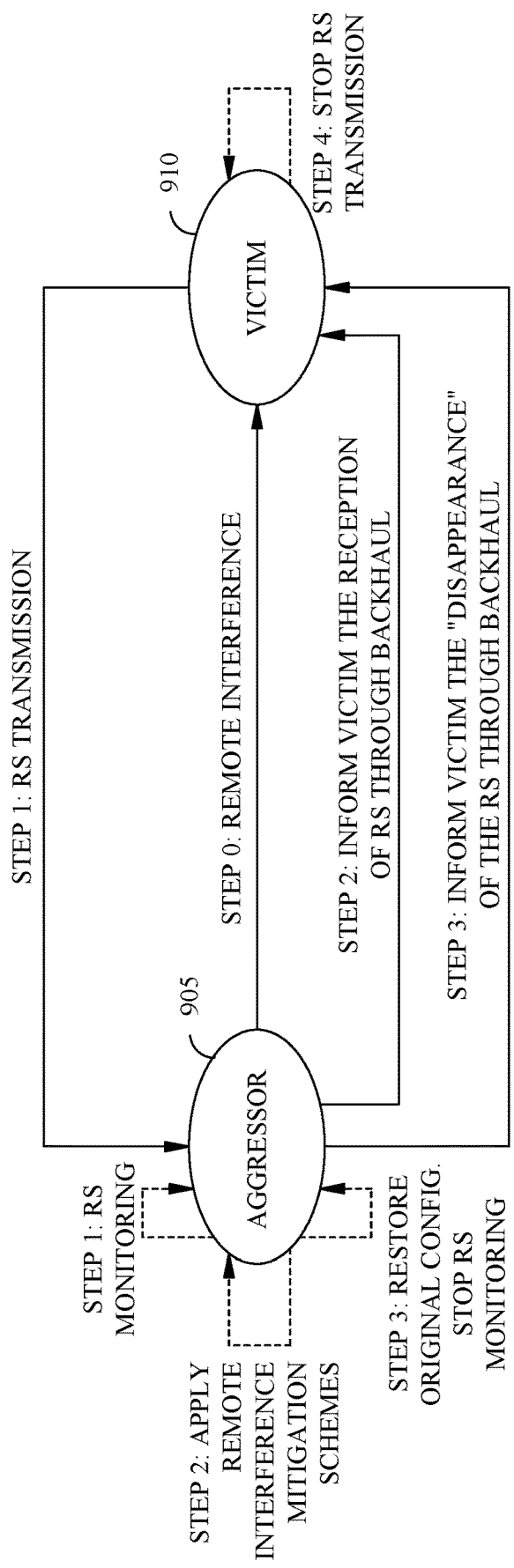
FIG. 9 illustrates yet another example remote interference management framework, in accordance with certain aspects of the present disclosure.

FIG. 9 shows another example RIM framework (e.g., referred to as framework 2.1). As shown in FIG. 9, at step 0, the aggressor(s) remote interferes the victim 910 (e.g., due to atmospheric dusting). At step 1, the victim 910 detects the remote interference (e.g., detects rise in IOT) and starts RS transmission to the aggressor 905. At step 1, the aggressor 905 starts monitoring RS as configured by OAM or when the aggressor 905 experiences remote interference. A set of BSs may transmit the same RS, which may carry the set ID. At step 2, the aggressor 905 receives the victim RS and starts remote interference mitigation. Also at step 2, the aggressor 905 informs the victim(s) 910, via backhaul, that the aggressor 905 received the RS. At step 3, the aggressor 905 informs the victim 910, via the backhaul, once the aggressor 905 stops receiving the RS from the victim 910 and the aggressor 905 restores the original configuration. At step 4, the victim 910 stops RS transmission upon the reception of the "disappearance of RS" information received from the aggressor 905 via the backhaul.

In yet another example RIM framework (e.g., referred to as framework 2.2, not shown), at step 0, the aggressor(s) remote interferes the victim (e.g., due to atmospheric dusting). At step 1, the victim detects the remote interference (e.g., detects the rise in IOT) and starts RS transmission to the aggressor. At step 1, the aggressor starts monitoring RS as configured by OAM or when the aggressor experiences remote interference. A set of BSs may transmit the same RS, which may carry the set ID. At step 2, the aggressor receives the victim RS and informs the victim(s), via backhaul, that the aggressor received the RS. Further at step 2, upon reception of the "reception of RS" information from the aggressor via the backhaul, the victim may send assistance information to assist in RIM coordination. At step 4, the aggressor starts remote interference mitigation. At step 5, the aggressor informs the victim, via the backhaul, once the aggressor stops receiving the RS from the victim and the aggressor restores the original configuration. At step 4, the victim stops RS transmission upon the reception of the "disappearance of RS" information received from the aggressor via the backhaul.

In certain systems, such as new radio (NR) systems, the BS may be referred to as a next generation node Bs (gNBs). gNBs may be grouped. The group of gNBs may be referred to as a "cluster", "cell group", or "cell set". The gNB cluster may be configured by OAM signaling, for example, by an OAM entity. The gNBs in the cluster may use identifiers that may be encoded into their RSs. In some examples, the remote interference is between two sets of gNBs causing remote interference to each other. The remote interference may be detectable by one or multiple gNBs in one or more both of the sets of gNBs.

Techniques are desirable for defining a group ID for a cell group; for an aggressor BS to identify the victim BS from a group ID; for supporting inter-gNB coordination via backhaul—given that two interfering gNBs may be far apart (e.g., up to 400 km apart); for coordinating intra-cluster; for changing member gNBs of a group; and for a static or dynamic set ID.

Example Cell Group Configuration and Backhaul Coordination for Remote Interference Management Aspects of the present disclosure provide techniques and apparatus for cell group configuration and backhaul coordination for remote interference management. The techniques and apparatus described herein address, and provide solutions for, the above problems.

Figure 10:
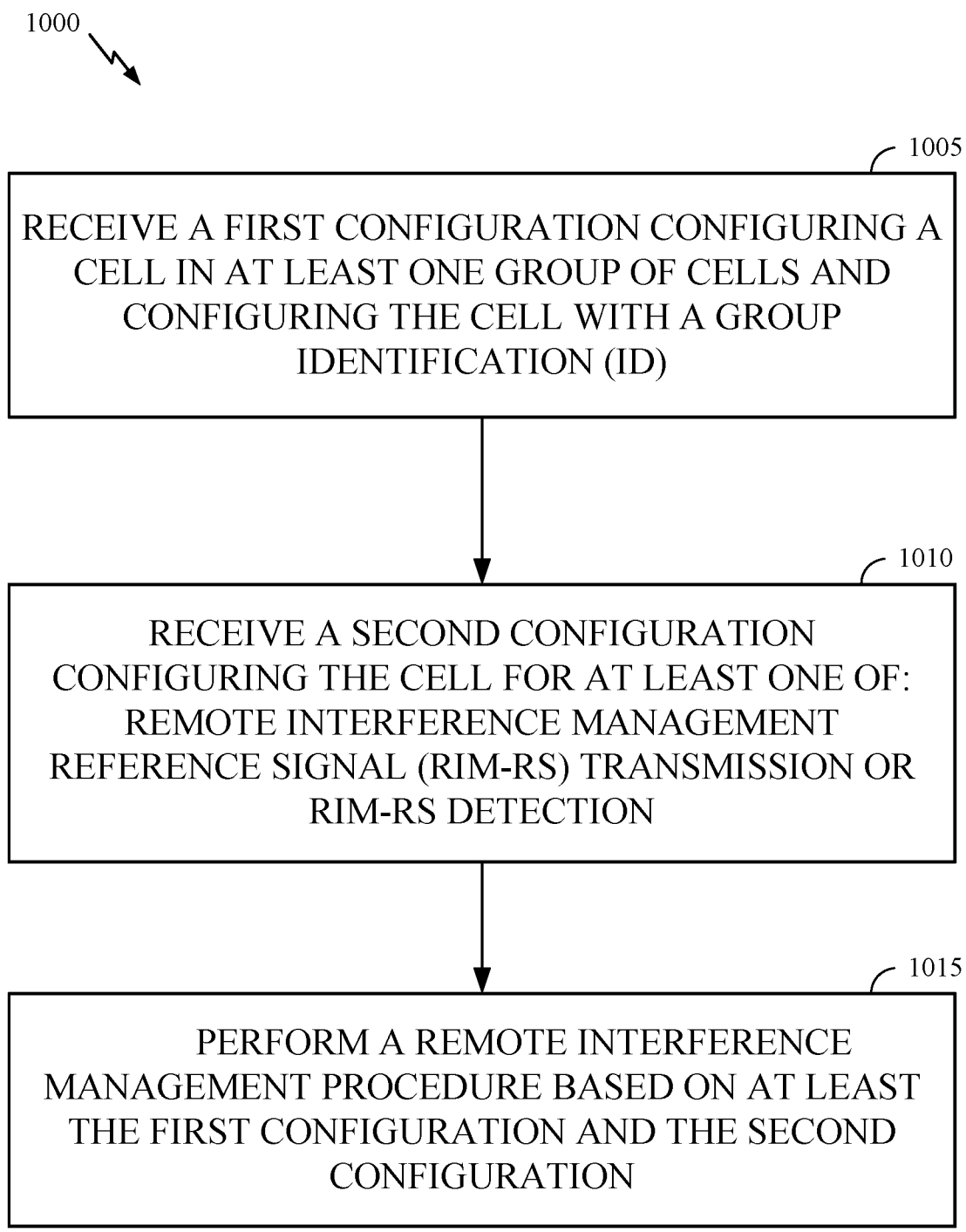
FIG. 10 is a flow diagram illustrating example operations by a group member cell, in accordance with certain aspects of the present disclosure.

FIG. 10 is a flow diagram illustrating example operations 1000 for communication, in accordance with certain aspects of the present disclosure. The operations 1000 may be performed, for example, by a base station (e.g., such as a BS 110*a* in the wireless communication network 100). Operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at 1005, by receiving a first configuration configuring a cell (of the BS) in at least one group of cells and configuring the cell with a group ID.

In some examples, the cell group configuration and group ID are configured by operations and management (OAM) signaling. The cell may be configured as part of remote interference detection cell group, a remote interference management reference signal (RIM-RS) receiving cell group, and/or an RIM-RS transmission cell group. The cell group for RIM-RS receiving can be the same as the cell group for remote interference detection. Each cell group may have a cell group coordinator (CGC). The CGC may be either a new logical entity or a function of an existing network entity, such as an OAM entity, a gNB, a central unit (CU), a multicast coordination entity (MCE), or some other dedicated network entity.

In some examples, when the cell is configured as part of a cell group for remote interference detection, the cell is configured with an address for the BS to report a remote interference detection result. In some examples, the cell is configured statically by the OAM. In some examples, the configured address is the address of the CGC. In some examples, the address is shared by all of the cells in the group for remote interference detection. This group could be large, even as large as one public land mobile network (PLMN). The cells may receive neighbor assistance. With neighbor assistance, each member of the cell group may detect RI with very high accuracy.

In some examples, the OAM dynamically configures the cell group for RIM-RS receiving based on RI reports. In some examples, when the cell is configured as part of a cell group for RIM-RS receiving (e.g., RIM-RS detection and reporting), the cell is configured with an address for the BS to report a RIM-RS, for example, to report a determine group ID of the cell group that transmitted the received RIM-RS. Determination of the group ID is discussed in more detail below. In some examples, the cell is configured statically by the OAM. In some example, the configured address is the address of the CGC.

In some examples, by default (e.g., without explicit indication), a cell group is an RIM-RS transmission group. In some examples, the cell is configured as part of a cell group for RIM-RS transmission. In some examples, the cell is configured (e.g., dynamically by the OAM as part of the received first configuration) as part of the cell group for RIM-RS transmission based on reporting RIM-RS reception and remote interference detection. The cells are configured with a group ID for the RIM-RS transmission. The cells in the cell group for RIM-RS transmission may include only adjacent cells that reported remote interference detection and that have a suitable beam and antenna configuration. The cells in the cell group for RIM-RS transmission may be configured to jointly transmit the same RIM-RS using the same waveform and the same time and frequency resources (e.g., similar to single-frequency network (SFN) transmission such as multicast-broadcast SFN (MBSFN)). As discussed below, the resources for the RIM-RS transmission may be configured dynamically by the CGC. As discussed below, the some examples, the CGC dynamically configures the members of the cell group for RIM-RS transmission.

At 1010, the BS receives a second configuration configuring the cell for RIM-RS transmission and/or RIM-RS detection. In some examples, the RIM-RS and/or RIM-RS detection configurations are configured by the CGC. In some examples, the CGC has radio resource management functions and the second configuration is a radio resource configuration.

In some examples, when the cell is configured (e.g., by the first configuration from the OAM) as part of a cell group for RIM-RS receiving (e.g., RIM-RS detection and RIM-RS reporting), the second configuration configures a set of group IDs and a set of RIM-RS resources associated with each group ID. The set of group IDs and the set of RIM-RS resources may be configured dynamically (e.g., by the CGC). The group IDs and RIM-RS resources are associated with a RIM-RS transmission from a non-adjacent cell group. The sets may provide a table, a mapping, etc., of the group IDs and the RIM-RS resources. Thus, the BS can determine the group ID, from the set of group IDs, of the cell group that transmitted an RIM-RS received, based on the resources used for the received RIM-RS. The set of RIM-RS resources may include a RIM-RS sequence ID, an orthogonal cover code (OCC), time resources (e.g., the uplink-downlink periodicity offset); frequency resources (e.g., subband ID); or spatial resources (e.g., beam configuration) used for a RIM-RS.

In some examples, when the cell is configured as part of a cell group for RIM-RS transmission, the second configuration dynamically configures the resources RIM-RS transmission. The group of cells for RIM-RS transmission are configured to transmit the same RIM-RS using the same waveform and the same time and frequency resources. In some examples, the CGC dynamically configures the members of the cell group for RIM-RS transmission (e.g., based on RI detection and RIM-RS reception reports).

At 1015, the BS performs a RIM procedure based on at least the first configuration and the second configuration. The BS may perform a RIM procedure according to one of the RIM frameworks discussed above with respect to FIGS. 7-9. In some examples, for a cell configured as part of a cell group for remote interference detection, performing the RIM procedure includes detecting remote interference and reporting the remote interference detection result to the configured address (e.g., the address configured by the OAM in the received first configuration). Detecting remote interference may include detecting presence of an increase (e.g., an increase beyond a threshold amount) of interference-over-thermal (IOT) caused by a downlink transmission of a non-adjacent cell in an uplink slot of the BS. In some examples, for a cell configured as part of a cell group for RIM-RS receiving, performing the RIM procedure includes receiving a RIM-RS, determining the group ID of the cell group that transmitted the RIM-RS, and reporting the determined group ID to the configured address (e.g., the address of the CGC configured by the OAM in the received first configuration).

As discussed above, remote interference is caused when a remote downlink signal (e.g., of the aggressor BS) falls in to an uplink slot (e.g., of the victim BS). The range of remote interference can be several hundreds of kilometres. Beyond this range, the remote interference may fall into further slot, which may be another DL slot and, therefore, not causing interference at the victim BS. According to aspects of the present disclosure, the group ID carried in RIM-RS (e.g., the group ID(s) configured in the received first or second configurations) may be reused. For example, the same group ID can be used by groups of BSs that are far enough apart. The reusable group ID for RIM-RS may be referred to as a physical cell group identifier (PCGI).

In some examples, the RIM-RS carries a first number of bits (e.g., up to 22 bits information). Due to group ID reuse, the number of bits may be reduced (e.g., only 12 bits). In some examples, the extra bit(s) carried by RIM-RS may be used to deliver remote interference coordination information (e.g., for framework 1 discussed above with respect to FIG. 8).

Figure 11:
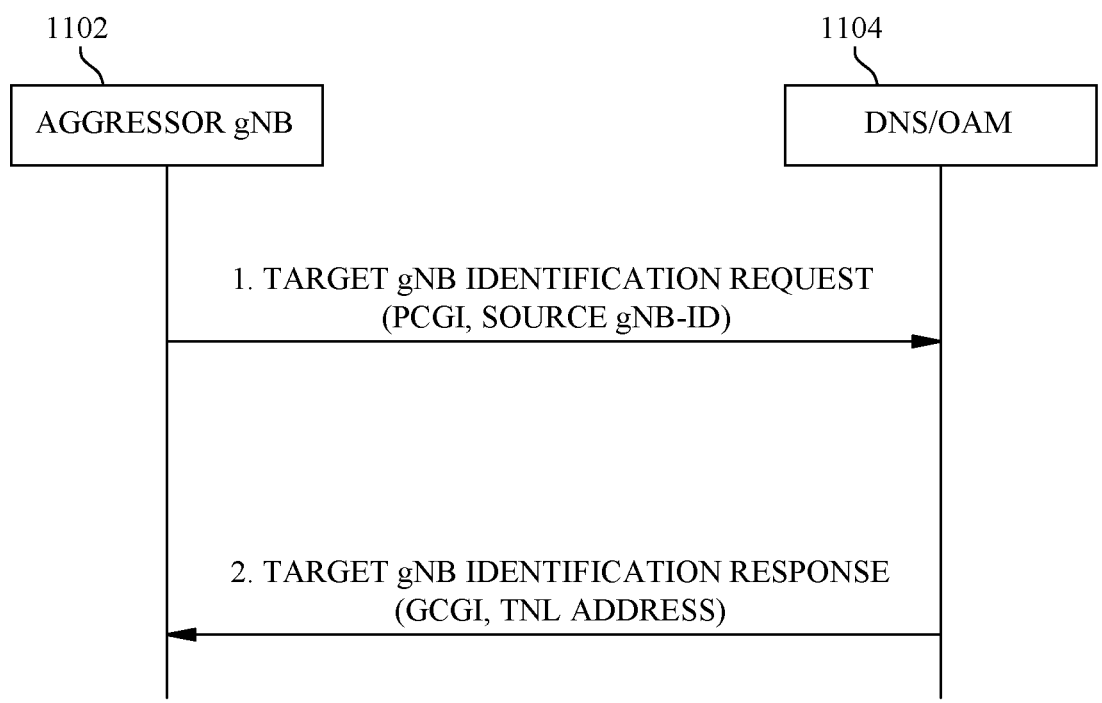
FIG. 11 is a call flow illustrating example target cell address derivation, in accordance with certain aspects of the present disclosure.

For backhaul coordination, a global unique global cell group ID (BCGI) and/or a transport network layer (TNL) address may be used for message routing. In some examples, the gNB ID may be used. In some examples, the GCGI and/or TNL address may be derived using the PCGI. As shown in FIG. 11, the BS, an aggressor gNB 1102, may send a request to a domain name service (DNS) or OAM server 1104 including the PCGI and an ID of the BS. In response to the request, the aggressor gNB 1102 may receive an indication from the DNS or OAM server 1104 of the GCGI and TNL for a target BS.

As discussed above, a remote interference may be caused by a group of cells (e.g., cells of one or more multiple BSs) and a remote interference victim may also be a group of cells (e.g., cells of one or more multiple BSs). It may not be efficient to have BS-BS direct coordination due to a potentially large number of connections and messages.

Figure 12:
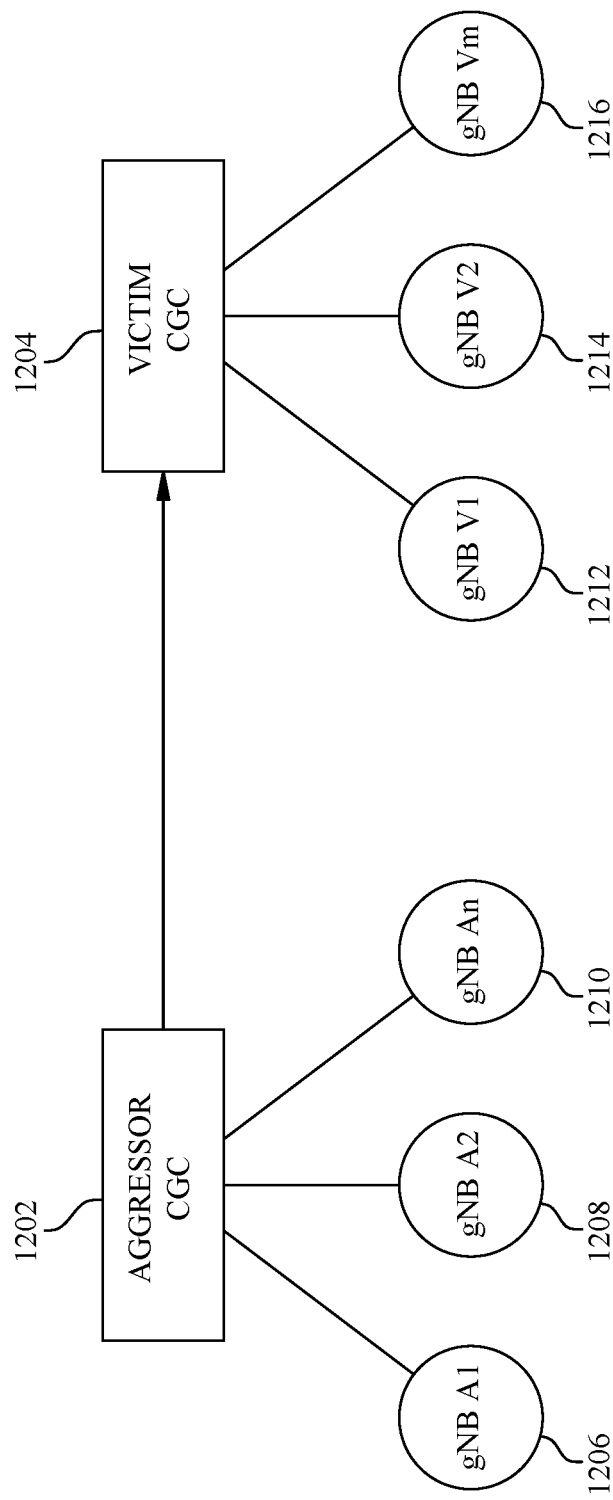
FIG. 12 illustrates an example of cell group coordinators (CGCs) acting as Internet Protocol (IP) gateways for member cells, in accordance with certain aspects of the present disclosure.

According to certain aspects, the CGC 1202 may act as an Internet Protocol (IP) multicast gateway for a group of aggressor cells 1206, 1208, 1210 and the CGC 1204 can act as an IP multicast gateway for a group of victim cells 1212, 1214, 1216, as shown in FIG. 12. The group members can join the multicast group. Thus, CGCs 1202 and 1204 can send each other coordination messages, which the receiving CGC can then multicast to its group members. The CGCs 1202, 1204 can determine the GCGI and TNL address (including the IP multicast of the victim CGC 1204) and sends a coordination message to the other CGC via backhaul using the determined GCGI and TNL address.

Thus, OAM may statically configure a BS with an address for RI reporting, and address for RIM-RS reporting, and/or an address for a target GCGI and TNL resolution. OAM may semi-statically configure a group ID (e.g., PCGI) and resource set for RIM-RS detection. OAM may dynamically configure resources for RIM-RS transmission. OAM may dynamically configure a group ID (e.g., PCGI), GCGI, and TNL address based on RI and RIM-RS reporting.

Figure 13:
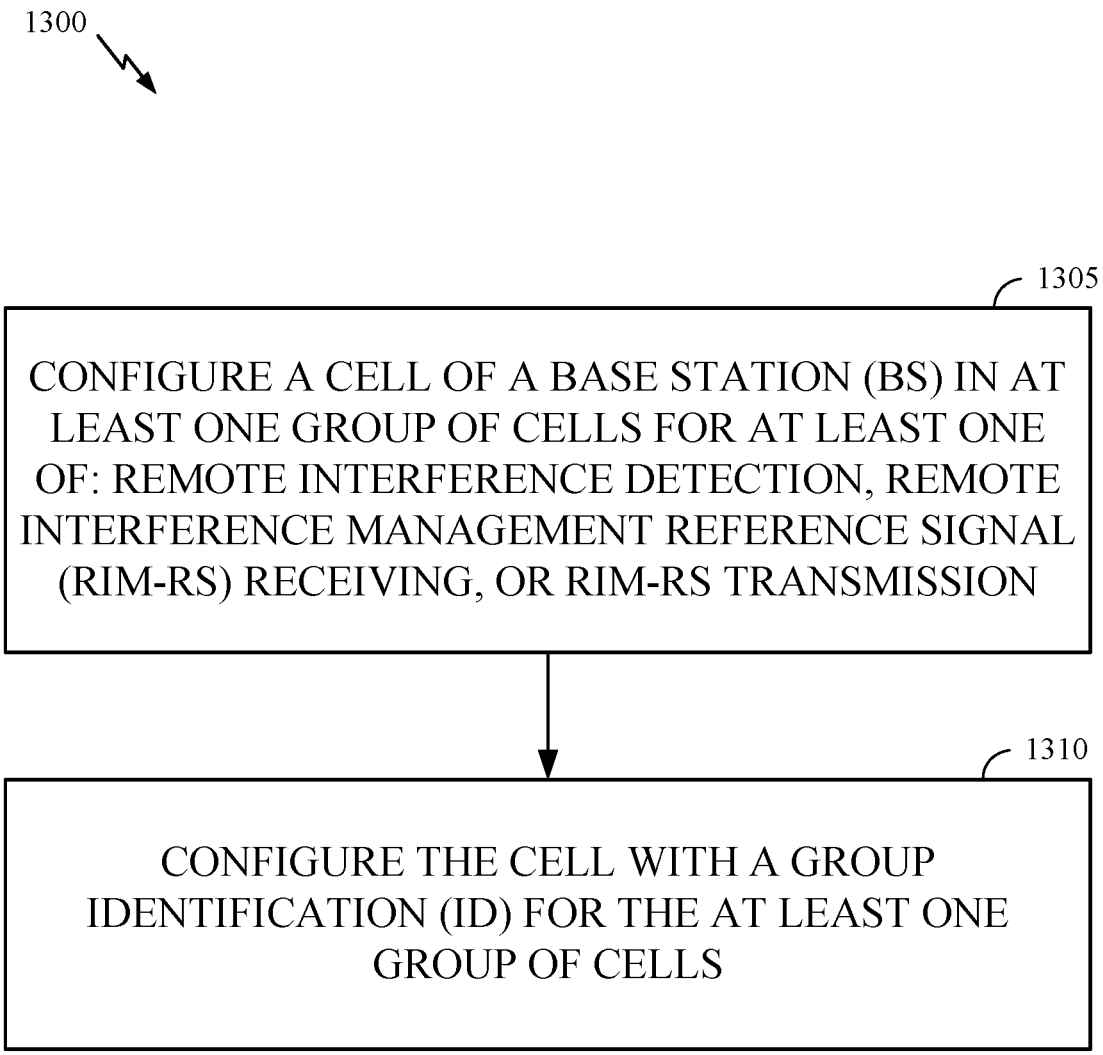
FIG. 13 is a flow diagram illustrating example operations by an operations and management (OAM) server, in accordance with certain aspects of the present disclosure.

FIG. 13 is a flow diagram illustrating example operations 1300 for communication, in accordance with certain aspects of the present disclosure. The operations 1300 may be performed, for example, by an OAM entity.

The operations 1300 may begin, at 1302, by configuring a cell of a BS in at least one group of cells for at least one of: remote interference detection, RIM-RS receiving, or RIM-RS transmission. In some examples, the OAM is a CGC.

At 1304, the OAM configures the cell with a group ID for the at least one group of cells. In some examples, the group ID is a PCGI.

According to certain aspects, the OAM configures the cell with an address (e.g., the address of the CGC) for the BS to report a remote interference detection result. In some examples, the OAM configures the address for all of the cells in the group for remote interference detection.

According to certain aspects, the OAM configures the cell with an address (e.g., the address of the CGC) to report a determined group ID for a detected RIM-RS. In some examples, the OAM semi-statically configures (e.g., if the OAM is the CGC) the cell in group of cells for RIM-RS receiving with a set of group IDs and a set of RIM-RS resources associated with each group ID, the set of group IDs and the set of RIM-RS resources associated with a RIM-RS transmitted by a non-adjacent group of cells.

According to certain aspects, the OAM dynamically configures the cell in a cell group for RIM-RS transmission based on received RI and RIM-RS reports. For example, the OAM may configure only adjacent cells that reported remote interference and that have a suitable beam and antenna configuration. In some example, the OAM dynamically configures (e.g., if the OAM is the CGC) resources for the RIM-RS transmission.

According to certain aspects, the OAM configures the BS with an identifier (e.g., GCGI) and TNL address for backhaul communication. In some examples, the OAM receives a request from the BS including the PCGI and an ID of the BS. The OAM may derive the GCGI and TNL using the PCGI and BS ID as input and send an indication to the BS of the derived GCGI and TNL.

According to certain aspects, the OAM may act as an IP gateway (e.g., if the OAM is the CGC). For example, the OAM can multicast coordination information to member cells in its group.

Figure 14:
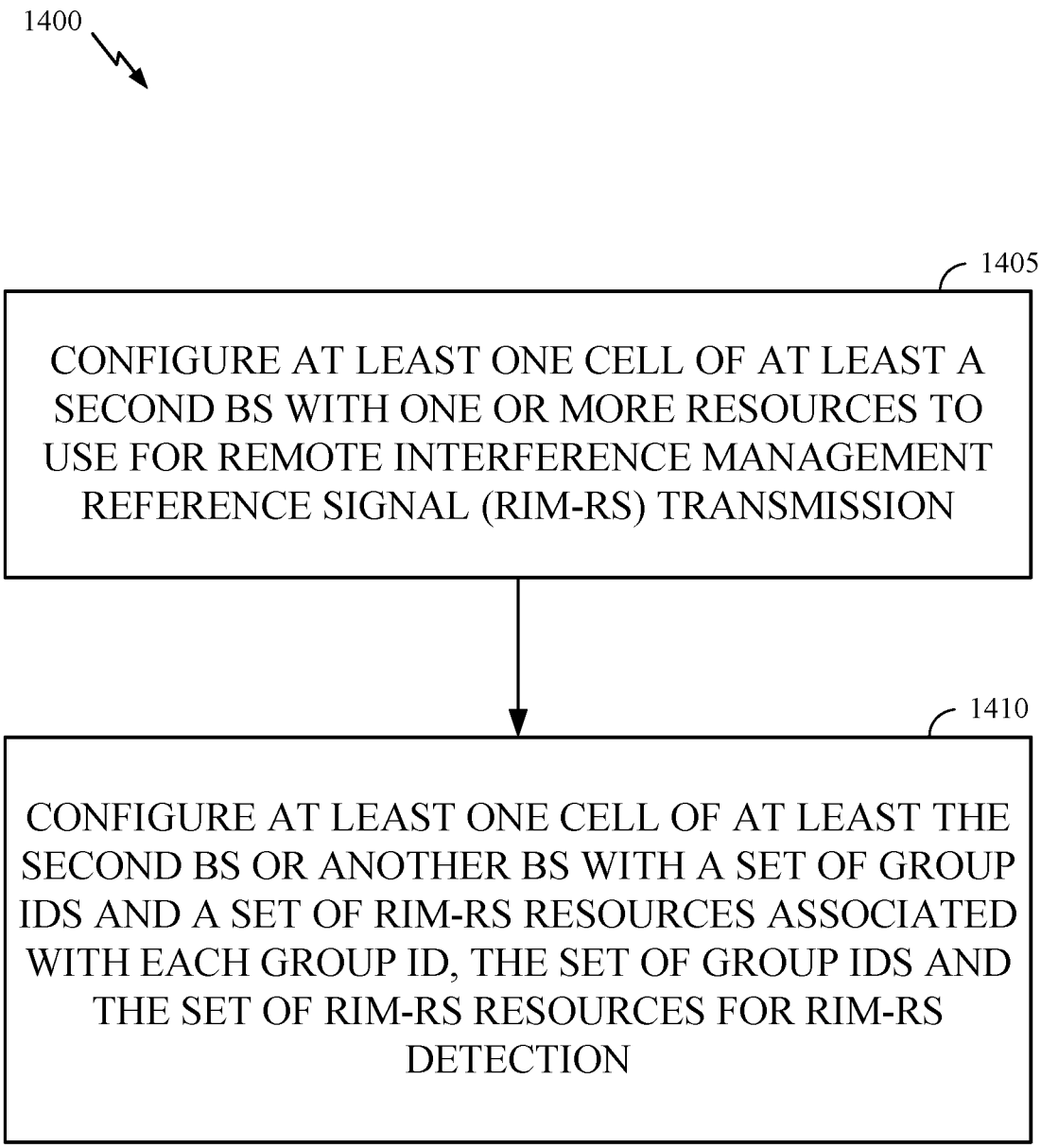
FIG. 14 is a flow diagram illustrating example operations by a cell group coordinator (CGC), in accordance with certain aspects of the present disclosure.

FIG. 14 is a flow diagram illustrating example operations 1400 for communication, in accordance with certain aspects of the present disclosure. The operations 1400 may be performed, for example, by a first BS (e.g., such as a BS 110a in the wireless communication network 100). In some examples, the first BS is a CGC.

The operations 1400 may begin, at 1405, by configuring (e.g., dynamically) at least one cell of at least a second BS with one or more resources to use for RIM-RS transmission.

At 1410, the BS configures (e.g., semi-statically) at least one cell of at least the second BS or another BS with a set of group IDs (e.g., PCGIs) and a set of RIM-RS resources associated with each group ID, the set of group IDs and the set of RIM-RS resources for RIM-RS detection. The set of group IDs and the set of associated RIM-RS resources are associated with, and for detecting, a RIM-RS transmitted by a non-adjacent group of cells.

In some examples, the CGC BS forms an IP multicast group including the members cells of its cell group. The CGC BS multicasts information to the members of the group. In some examples, the CGC sends coordination message to a remote CGC via a backhaul using a GCGI and a TNL address (e.g., obtained from a DNS server or OAM).

Figure 15:
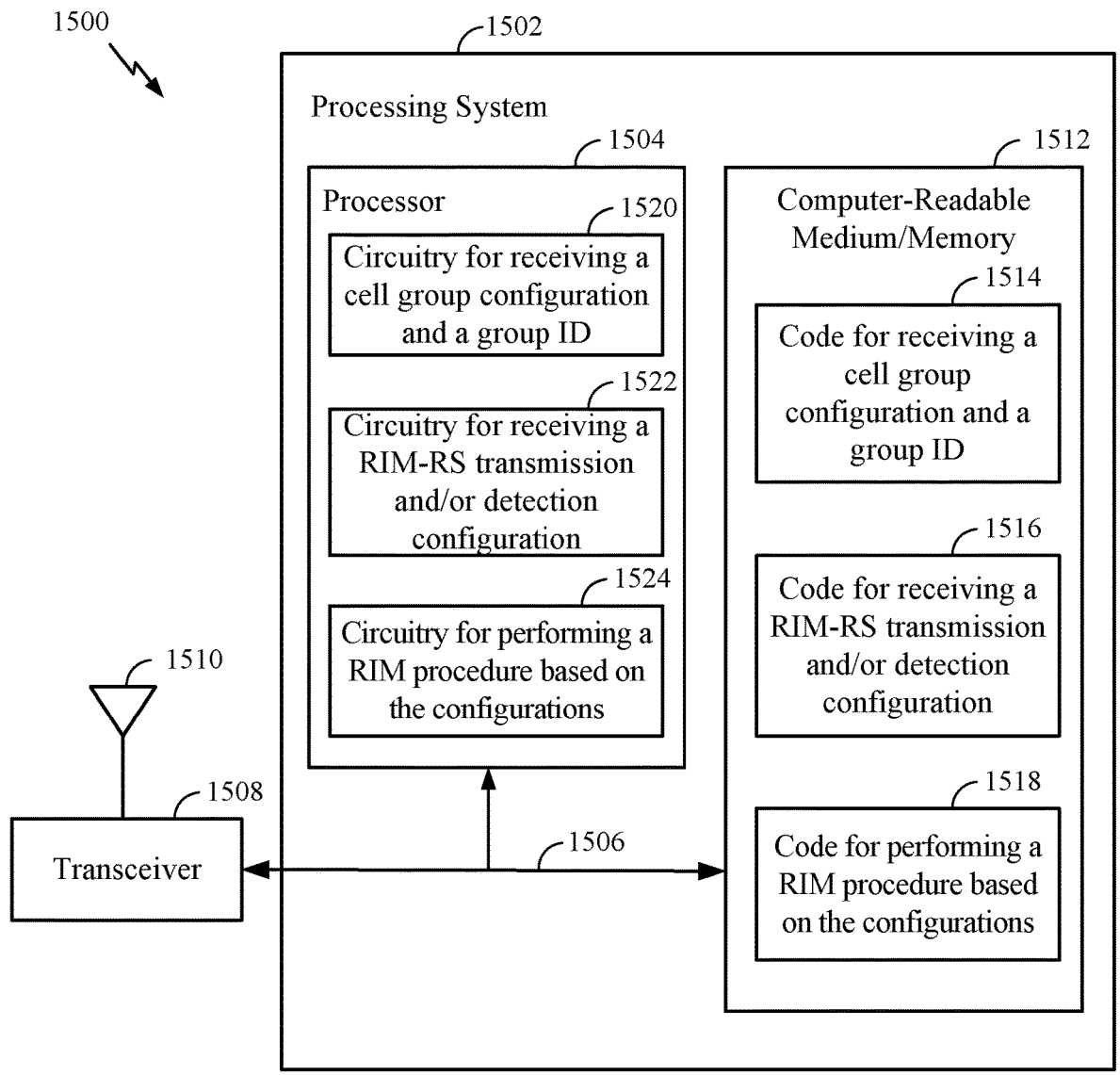
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 10. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 10, or other operations for performing the various techniques discussed herein for cell group configuration and backhaul coordination for RIM. In certain aspects, computer-readable medium/memory 1512 stores code 1514 for receiving a cell group configuration and a group ID; code 1516 for receiving a RIM-RS transmission and/or detection configuration; and code 1518 for performing a RIM procedure based on the configurations, in accordance with aspects of the present disclosure. In certain aspects, the processor 1504 has circuitry configured to implement the code stored in the computer-readable medium/memory 1512. The processor 1504 includes circuitry 1520 for receiving a cell group configuration and a group ID; circuitry 1522 for receiving a RIM-RS transmission and/or detection configuration; and circuitry 1524 for performing a RIM procedure based on the configurations, in accordance with aspects of the present disclosure.

Figure 16:
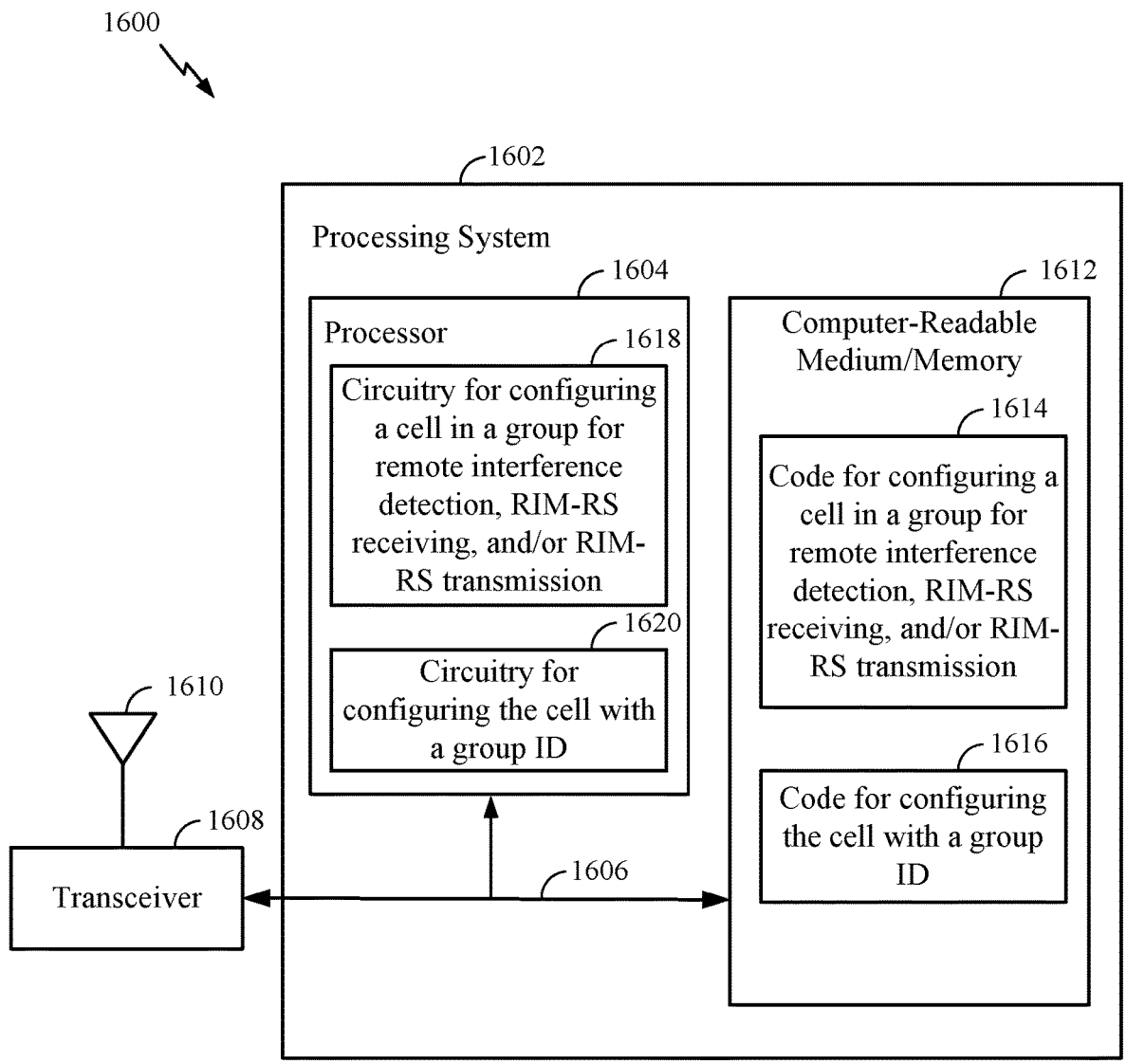
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 13. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 13, or other operations for performing the various techniques discussed herein for cell group configuration and backhaul coordination for RIM. In certain aspects, computer-readable medium/memory 1612 stores code 1614 for configuring a cell in a group for remote interference detection, RIM-RS receiving, and/or RIM-RS transmission and code 1616 for configuring the cell with a group ID, in accordance with aspects of the present disclosure. In certain aspects, the processor 1604 has circuitry configured to implement the code stored in the computer-readable medium/memory 1612. The processor 1604 includes circuitry 1618 for configuring a cell in a group for remote interference detection, RIM-RS receiving, and/or RIM-RS transmission and circuitry 1620 for configuring the cell with a group ID, in accordance with aspects of the present disclosure.

Figure 17:
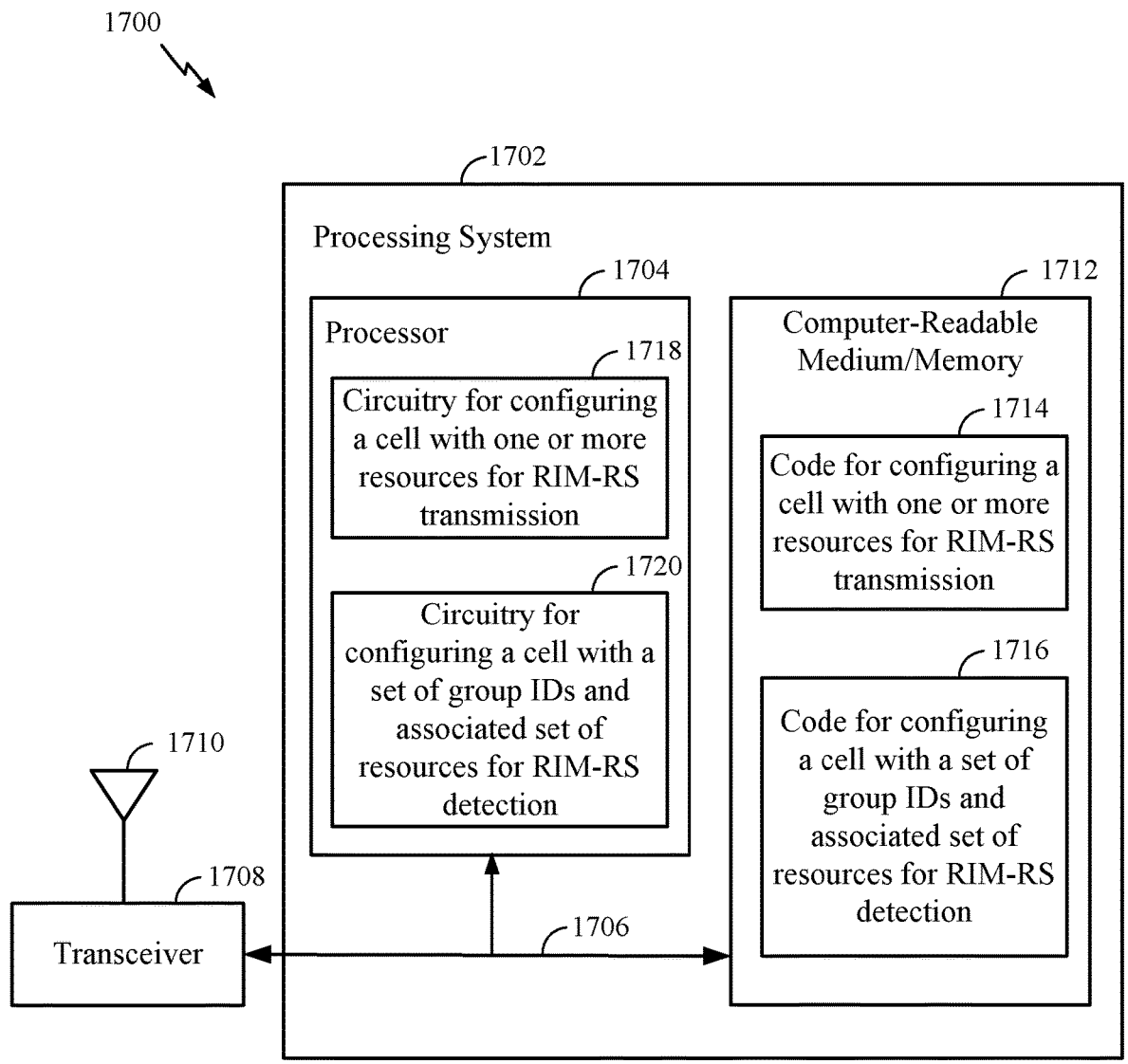
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 14. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 14, or other operations for performing the various techniques discussed herein for cell group configuration and backhaul coordination for RIM. In certain aspects, computer-readable medium/memory 1712 stores code 1714 for configuring a cell with one or more resources for RIM-RS transmission and code 1716 for configuring a cell with a set of group IDs and associated set of resources for RIM-RS detection, in accordance with aspects of the present disclosure. In certain aspects, the processor 1704 has circuitry configured to implement the code stored in the computer-readable medium/memory 1712. The processor 1704 includes circuitry 1718 for configuring a cell with one or more resources for RIM-RS transmission and code 1720 for configuring a cell with a set of group IDs and associated set of resources for RIM-RS detection, in accordance with aspects of the present disclosure.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 10, FIG. 13, and/or FIG. 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for communications by a base station (BS), comprising:
    receiving a first configuration configuring a cell in at least one group of cells and configuring the cell with a group identification (ID), wherein the group ID is reused for one or more other groups of cells outside a remote interference range;

receiving a second configuration configuring the cell for at least one of: remote interference management reference signal (RIM-RS) transmission or RIM-RS detection; and performing a RIM procedure based on at least the first configuration and the second configuration.

2. The method of claim 1, wherein:
the first configuration is received from an operation and management (OAM) entity; and
the second configuration is received from a cell group coordinator (CGC), wherein the CGC comprises a BS, an OAM entity, a dedicated network entity, or a combination thereof.

3. The method of claim 1, wherein the first configuration configures the cell in the at least one group of cells for remote interference detection, RIM-RS receiving, RIM-RS transmission, or a combination thereof.

4. The method of claim 1, wherein:
the first configuration comprises an address for the BS to report a remote interference detection result; and
performing the RIM procedure includes:
  detecting remote interference; and
  reporting the remote interference detection result to the configured address.

5. The method of claim 4, wherein:
detecting remote interference comprises detecting presence of an increase of interference over thermal (IOT) caused by a downlink transmission of a non-adjacent cell in an uplink slot of the BS.

6. The method of claim 4, wherein:
the second configuration comprises a set of group IDs and a set of RIM-RS resources associated with each group ID; and
the method further comprises:
  detecting one or more RIM-RS based on the configured set of group IDs and RIM-RS resources; and
  detecting the remote interference based on the one or more RIM-RS.

7. The method of claim 6, further comprising determining a group ID of a cell group that transmitted a RIM-RS received by the BS based on the resources used for the received RIM-RS.

8. The method of claim 6, wherein the set of RIM-RS resources comprises at least one of: a sequence ID, an orthogonal cover code (OCC), time resources, frequency resources, or spatial resources used for a RIM-RS.

9. The method of claim 1, wherein the group of cells is for RIM-RS transmission are configured to transmit one or more RIM-RS using a same waveform and a same time and frequency resources.

10. The method of claim 1, further comprising receiving a configuration of a group ID for the group of cells for RIM-RS transmission and resources for the RIM-RS transmission, wherein the group ID is included in the RIM-RS transmission.

11. The method of claim 1, further comprising:
determining an identifier for RIM message routing via backhaul.

12. The method of claim 11, wherein the identifier is derived based on an indication from a domain name service (DNS) or operation and management (OAM) server.

13. A method for communications by an operation and management (OAM) entity, comprising:
configuring a cell of a base station (BS) in at least one group of cells for at least one of: remote interference detection, remote interference management reference signal (RIM-RS) receiving, or RIM-RS transmission; and configuring the cell with a group identification (ID) for the at least one group of cells, wherein the group ID is reused for one or more groups of cells outside a remote interference range.

14. The method of claim 13, further comprising statically configuring the cell with an address for the BS to report a remote interference detection result.

15. The method of claim 13, further comprising:
semi-statically configuring the cell in group of cells for RIM-RS receiving with a set of group IDs and a set of RIM-RS resources associated with each group ID, the set of group IDs and the set of RIM-RS resources associated with a RIM-RS transmitted by a non-adjacent group of cells.

16. The method of claim 15, wherein the set of RIM-RS resources comprises a sequence ID, an orthogonal cover code (OCC), time resources, frequency resources, spatial resources used for the RIM-RS transmitted by the non-adjacent group of cells, or a combination thereof.

17. The method of claim 13, further comprising:
semi-statically configuring the cell in group of cells for RIM-RS transmitting with a set of group IDs and a set of RIM-RS resources for transmitting RIM-RS associated with each group ID.

18. The method of claim 13, further comprising:
receiving at least one of: a reported RIM-RS reception or a reported remote interference detection; and
dynamically configuring the cell in a group of cells for RIM-RS transmission based on the reported RIM-RS reception or remote interference detection, the group of cells for RIM-RS transmission are configured to jointly transmit the same RIM-RS using the same waveform and the same time and frequency resources.

19. The method of claim 18, wherein configuring the group of cells for RIM-RS transmission comprises including only adjacent cells that reported remote interference detection and that have a suitable beam and antenna configuration.

20. The method of claim 13, further comprising:
configuring the BS with an identifier for backhaul communications.

21. An apparatus for communications, comprising:
a memory comprising computer executable instructions; and
at least one processor coupled with the memory and configured to execute the computer executable instructions and cause the apparatus to:
  receive a first configuration configuring a cell in at least one group of cells and configuring the cell with a group identification (ID), wherein the group ID is reused for one or more groups of cells outside a remote interference range;
  receive a second configuration configuring the cell for at least one of: remote interference management reference signal (RIM-RS) transmission or RIM-RS detection; and
  perform a RIM procedure based on at least the first configuration and the second configuration.

22. The apparatus of claim 21, wherein:
the second configuration comprises a set of group IDs and a set of RIM-RS resources associated with each group ID; and
at least one processor is configured to cause the apparatus further to:

detect one or more RIM-RS based on the configured set of group IDs and RIM-RS resources; and
detect the remote interference based on the one or more RIM-RS.

23. The apparatus of claim 21, wherein the at least one processor is configured to cause the apparatus further to receive a configuration of a group ID for the group of cells for RIM-RS transmission and resources for the RIM-RS transmission, wherein the group ID is included in the RIM-RS transmission.

24. The apparatus of claim 21, wherein the at least one processor is configured to cause the apparatus further to determine an identifier for RIM message routing via backhaul.

25. An apparatus for communications, comprising:
a memory comprising computer executable instructions; and
at least one processor coupled with the memory and configured to execute the computer executable instructions and cause the apparatus to:
configure a cell of a base station (BS) in at least one group of cells for at least one of: remote interference detection, remote interference management reference signal (RIM-RS) receiving, or RIM-RS transmission; and
configure the cell with a group identification (ID) for the at least one group of cells, wherein the group ID is reused for one or more groups of cells outside a remote interference range.

26. The apparatus of claim 25, wherein the at least one processor is configured to cause the apparatus further to:
semi-statically configure the cell in a group of cells for RIM-RS receiving with a set of group IDs and a set of RIM-RS resources associated with each group ID, the set of group IDs and the set of RIM-RS resources associated with a RIM-RS transmitted by a non-adjacent group of cells; and
semi-statically configuring the cell in a group of cells for RIM-RS transmitting with a set of group IDs and a set of RIM-RS resources for transmitting RIM-RS associated with each group ID.

* * * * *